US012334776B2

(12) United States Patent
Lee

(10) Patent No.: US 12,334,776 B2
(45) Date of Patent: Jun. 17, 2025

(54) STATOR AND MOTOR INCLUDING THE SAME

(71) Applicant: HYUNDAI MOBIS CO., LTD., Seoul (KR)

(72) Inventor: Jae Min Lee, Yongin-si (KR)

(73) Assignee: Hyundai Mobis Co., Ltd., Seoul (KR)

( * ) Notice: Subject to any disclaimer, the term of this patent is extended or adjusted under 35 U.S.C. 154(b) by 507 days.

(21) Appl. No.: 17/579,884

(22) Filed: Jan. 20, 2022

(65) Prior Publication Data

US 2023/0079442 A1   Mar. 16, 2023

(30) Foreign Application Priority Data

Sep. 10, 2021   (KR) .......................... 10-2021-0120870

(51) Int. Cl.
| | |
|---|---|
| *H02K 1/16* | (2006.01) |
| *H02K 3/12* | (2006.01) |
| *H02K 3/28* | (2006.01) |
| H02K 15/0428 | (2025.01) |

(52) U.S. Cl.
CPC ................ *H02K 1/16* (2013.01); *H02K 3/12* (2013.01); *H02K 3/28* (2013.01); H02K 15/0428 (2013.01)

(58) Field of Classification Search
CPC .. H02K 3/12; H02K 3/14; H02K 3/50; H02K 3/505; H02K 3/28; H02K 15/0025; H02K 15/0087; H02K 15/0428; H02K 15/064; H02K 15/0414; H02K 15/0421; H02K 1/16; H02K 3/52
See application file for complete search history.

(56) References Cited

U.S. PATENT DOCUMENTS

| | | | |
|---|---|---|---|
| 2014/0210286 A1 | 7/2014 | Guercioni | |
| 2018/0309337 A1 | 10/2018 | Lee et al. | |
| 2020/0212747 A1 | 7/2020 | Deng et al. | |
| 2020/0395804 A1 * | 12/2020 | Ahmed | H02K 3/14 310/198 |

(Continued)

FOREIGN PATENT DOCUMENTS

| | | | | |
|---|---|---|---|---|
| CN | 213990307 U | * | 8/2021 | ............... H02K 1/16 |
| DE | 102011004639 A1 | * | 8/2012 | ............... H02K 3/18 |

(Continued)

OTHER PUBLICATIONS worldwide.espacenet.com translation of CN213990307U (Year: 2021).*

(Continued)

*Primary Examiner* — Alexander A Singh
(74) *Attorney, Agent, or Firm* — NSIP Law

(57) ABSTRACT

Disclosed are stators including a stator core having a plurality of slots formed in a circumferential direction, a plurality of coil bundles respectively inserted into the plurality of slots, connection coils each having one side joined to one of the plurality of coil bundles, and the other side joined to another of the plurality of coil bundles, and a plurality of layers being respectively formed in the plurality of slots in a radial direction of the stator core, wherein the plurality of coil bundles each comprises a plurality of hairpins each including a crown portion protruding toward one side in an axial direction of the stator core, and a leg portion protruding toward the other side in the axial direction.

11 Claims, 9 Drawing Sheets

(56) References Cited

U.S. PATENT DOCUMENTS

2021/0152064 A1* 5/2021 Ruggieri .............. H02K 15/064
29/732

FOREIGN PATENT DOCUMENTS

| | | | | |
|---|---|---|---|---|
| DE | 102018222751 A1 * | 6/2020 | ............... | H02K 3/18 |
| GB | 2588388 A | 4/2021 | | |
| JP | 2011-182524 A | 9/2011 | | |
| JP | 2012-55074 A | 3/2012 | | |
| KR | 10-2014-0063530 A | 5/2014 | | |
| KR | 10-2018-0117476 A | 10/2018 | | |

OTHER PUBLICATIONS

PE2E translation of DE_102011004639_A1 (Year: 2012).*
PE2E translation of DE_102018222751_A1 (Year: 2020).*
Partial European search report issued on Jul. 5, 2022, in counterpart European Patent Application No. 21218269.5 (17 pages in English).
Korean Office Action issued on Apr. 14, 2023, in counterpart Korean Patent Application No. 10-2021-0120870 (9 pages in Korean).
Extended European search report issued on Dec. 2, 2022, in counterpart European Patent Application No. 21218269.5 (16 pages in English).

\* cited by examiner

STATOR AND MOTOR INCLUDING THE SAME

CROSS-REFERENCE TO RELATED APPLICATION

This application claims the benefit under 35 USC § 119(a) of Korean Patent Application No. 10-2021-0120870 filed in the Korean Intellectual Property Office on Sep. 10, 2021, the entire disclosure of which are incorporated herein by reference for all purposes.

BACKGROUND

1. Field

The following description relates to a stator and a motor including the same, and more particularly, to a stator capable of being used for a hairpin motor, and a motor including the same.

2. Description of the Related Art

An angled winding hairpin motor having angled coils disposed in slots of a stator is advantageous in miniaturizing the motor because a space factor of the coil in the slot may be maximized. Meanwhile, the inductance varies depending on the position of layer, and the layer is a concept that means an individual position of the angled coil during a process of inserting the coils into the slots. In addition, because the respective slots have different phases of counter electromotive forces from each other, it is necessary to design the coil of the motor in order to prevent a difference in inductance and a difference in phase of counter electromotive force between parallel circuits in a case in which the parallel circuits are provided in the motor. If there are a difference in inductance and a difference in phase of counter electromotive force between the parallel circuits, circulating current is generated, which excessively raises a temperature of the motor.

Meanwhile, a hairpin, which constitutes the coil provided in the hairpin motor, has two legs, such that an even number of layers are also provided, and the number of layers is multiples of two. Therefore, because it is extremely restrictive to select an equivalent serial number of turns at the time of designing the hairpin motor in the related art, it is difficult to optimally design the motor.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, there is provided a stator including a stator core having a plurality of slots formed in a circumferential direction, a plurality of coil bundles respectively inserted into the plurality of slots, connection coils each having one side joined to one of the plurality of coil bundles, and the other side joined to another of the plurality of coil bundles, and a plurality of layers being respectively formed in the plurality of slots in a radial direction of the stator core, wherein the plurality of coil bundles each comprises a plurality of hairpins each including a crown portion protruding toward one side in an axial direction of the stator core, and a leg portion protruding toward the other side in the axial direction.

An odd number of the plurality of layers may be respectively formed in the plurality of slots.

The connection coil may include a first extension region extending in a first direction, a second extension region extending in a second direction and having one end portion connected to one end portion of the first extension region, a first joint region connected to the other end portion of the first extension region and joined to a leg portion extended from a hairpin of the plurality of hairpins, and a second joint region connected to the other end portion of the second extension region and joined to a leg portion extended from another hairpin of the plurality of hairpins, and wherein the first extension region and the first joint region have a shape symmetric to the second extension region and the second joint region.

The first extension region and the second extension region may be disposed closer to the stator core than are the first joint region and the second joint region.

The first joint region may be disposed to overlap the leg portion joined to the first joint region, and the second joint region may be disposed to overlap the leg portion joined to the second joint region in the radial direction.

The plurality of coil bundles may be supplied with three-phase current, wherein the plurality of coil bundles may include a first coil bundle configured to be supplied with U-phase current of the three-phase current, a second coil bundle configured to be supplied with V-phase current of the three-phase current, and a third coil bundle configured to be supplied with W-phase current of the three-phase current, and wherein the connection coils may include a first connection coil joined to the plurality of hairpins provided in the first coil bundle, a second connection coil joined to the plurality of hairpins provided in the second coil bundle, and a third connection coil joined to the plurality of hairpins provided in the third coil bundle.

At least one of the first to third connection coils may be respectively joined to the two hairpins provided in an outermost or innermost layer of the plurality of hairpins in the radial direction.

The first coil bundle may include a first-first parallel coil may include an extension line and a neutral line disposed at one end portion and the other end portion thereof, and the neutral line of the first-first parallel coil may be disposed adjacent to the outermost or innermost layer in the radial direction.

The first coil bundle further may include a first-second parallel coil comprising an extension line and a neutral line disposed at one end portion and the other end portion thereof, and the neutral line of the first-second parallel coil may be disposed adjacent to the outermost or innermost layer in the radial direction.

The neutral line provided in the first-first parallel coil and the neutral line provided in the first-second parallel coil may be disposed on the outermost layer in the radial direction or the innermost layer in the radial direction.

The stator core may have forty-eight slots in the circumferential direction, and five layers may be disposed in each of the slots in the radial direction.

The first-first parallel coil and the first-second parallel coil may be respectively inserted into the slots to have a combination of five slot pitches, six slot pitches, and seven slot pitches.

The forty-eight slots may include a first to forty-eighth slots in the circumferential direction, and the layers may include a first to fifth layers in the radial direction of the slots, wherein the neutral line of the first-first parallel coil may be disposed on the fifth layer of the first slot, wherein the first-first parallel coil sequentially passes through the fifth layer of the seventh slot, the fourth layer of the thirteenth slot, the third layer of the nineteenth slot, the second layer of the twenty-fifth slot, the first layer of the thirty-first slot, the first layer of the thirty-eighth slot, the second layer of the thirty-second slot, the third layer of the twenty-sixth slot, the fourth layer of the twentieth slot, the fifth layer of the fourteenth slot, the fifth layer of the twentieth slot, the fourth layer of the twenty-sixth slot, the third layer of the thirty-second slot, the second layer of the thirty-eighth slot, the first layer of the forty-fourth slot, the first layer of the first slot, the second layer of the forty-third slot, the third layer of the thirty-seven slot, the fourth layer of the thirty-first slot, the fifth layer of the twenty-fifth slot, the fifth layer of the thirty-first slot, the fourth layer of the thirty-seven slot, the third layer of the forty-third slot, the second layer of the first slot, the first layer of the seventh slot, the first layer of the fourteenth slot, the second layer of the eighth slot, the third layer of the second slot, the fourth layer of the forty-fourth slot, the fifth layer of the thirty-eighth slot, the fifth layer of the forty-fourth slot, the fourth layer of the second slot, the third layer of the eighth slot, the second layer of the fourteenth slot, the first layer of the twentieth slot, the first layer of the twenty-fifth slot, the second layer of the nineteenth slot, and the third layer of the thirteenth slot, and wherein the extension line of the first-first parallel coil may be disposed on the fourth layer of the seventh slot.

The first connection coil may include a first-first connection coil, and wherein the first-first connection coil connects a region protruding from the fifth layer of the first slot and a region protruding from the fifth layer of the seventh slot of the first-first parallel coil, connects a region protruding from the fifth layer of the fourteenth slot and a region protruding from the fifth layer of the twentieth slot of the first-first parallel coil, connects a region protruding from the fifth layer of the twenty-fifth slot and a region protruding from the fifth layer of the thirty-first slot of the first-first parallel coil, and connects a region protruding from the fifth layer of the thirty-eighth slot and a region protruding from the fifth layer of the forty-fourth slot of the first-first parallel coil.

The neutral line of the first-second parallel coil may be disposed on the fifth layer of the second slot, wherein the first-second parallel coil sequentially passes through the fifth layer of the eighth slot, the fourth layer of the fourteenth slot, the third layer of the twentieth slot, the second layer of the twenty-sixth slot, the first layer of the thirty-second slot, the first layer of the thirty-seven slot, the second layer of the thirty-first slot, the third layer of the twenty-fifth slot, the fourth layer of the nineteenth slot, the fifth layer of the thirteenth slot, the fifth layer of the nineteenth slot, the fourth layer of the twenty-fifth slot, the third layer of the thirty-first slot, the second layer of the thirty-seven slot, the first layer of the forty-third slot, the first layer of the second slot, the second layer of the forty-fourth slot, the third layer of the thirty-eighth slot, the fourth layer of the thirty-second slot, the fifth layer of the twenty-sixth slot, the fifth layer of the thirty-second slot, the fourth layer of the thirty-eighth slot, the third layer of the forty-fourth slot, the second layer of the second slot, the first layer of the eighth slot, the first layer of the thirteenth slot, the second layer of the seventh slot, the third layer of the first slot, the fourth layer of the forty-third slot, the fifth layer of the thirty-seven slot, the fifth layer of the forty-third slot, the fourth layer of the first slot, the third layer of the seventh slot, the second layer of the thirteenth slot, the first layer of the nineteenth slot, the first layer of the twenty-sixth slot, the second layer of the twentieth slot, and the third layer of the fourteenth slot, and wherein the extension line of the first-second parallel coil may be disposed on the fourth layer of the eighth slot.

The first connection coil may include a first-second connection coil, and wherein the first-second connection coil connects a region protruding from the fifth layer of the second slot and a region protruding from the fifth layer of the eighth slot of the first-second parallel coil, connects a region protruding from the fifth layer of the thirteenth slot and a region protruding from the fifth layer of the nineteenth slot of the first-second parallel coil, connects a region protruding from the fifth layer of the twenty-sixth slot and a region protruding from the fifth layer of the thirty-second slot of the first-second parallel coil, and connects a region protruding from the fifth layer of the thirty-seven slot and a region protruding from the fifth layer of the forty-third slot of the first-second parallel coil.

In one general aspect, there is provided a stator including a stator core having a plurality of slots formed in a circumferential direction, a plurality of coil bundles respectively inserted into the plurality of slots, and a plurality of layers being respectively formed in the plurality of slots in a radial direction of the stator core, wherein the plurality of coil bundles each including a plurality of hairpins each including a crown portion protruding toward one side in an axial direction of the stator core, and a leg portion protruding toward the other side in the axial direction, and wherein some of the plurality of leg portions protruding from an outermost or innermost layer in the radial direction is joined to one another to form joint regions.

The two leg portions joined in the joint region may be bent in one direction of the circumferential direction, and the other of the two leg portions joined in the joint region may be bent in the other direction of the circumferential direction.

In one general aspect, there is provided a motor including a stator, and a rotor, wherein the stator includes a stator core having a plurality of slots formed in a circumferential direction, a plurality of coil bundles respectively inserted into the plurality of slots, connection coils each having one side joined to one of the plurality of coil bundles, and the other side joined to another of the plurality of coil bundles, and a plurality of layers being respectively formed in the plurality of slots in a radial direction of the stator core, wherein the plurality of coil bundles each includes a plurality of hairpins each including a crown portion protruding toward one side in an axial direction of the stator core, and a leg portion protruding toward the other side in the axial direction.

In one general aspect, there is provided a motor including a stator, and a rotor, wherein the stator includes a stator core having a plurality of slots formed in a circumferential direction, a plurality of coil bundles respectively inserted into the plurality of slots, and a plurality of layers being respectively formed in the plurality of slots in a radial direction of the stator core, wherein the plurality of coil bundles each includes a plurality of hairpins each including a crown portion protruding toward one side in an axial direction of the stator core, and a leg portion protruding toward the other side in the axial direction, and wherein some of the plurality of leg portions protruding from an outermost or innermost layer in the radial direction are joined to one another and define joint regions.

Other features and aspects will be apparent from the following detailed description, the drawings, and the claims.

Figure 1:
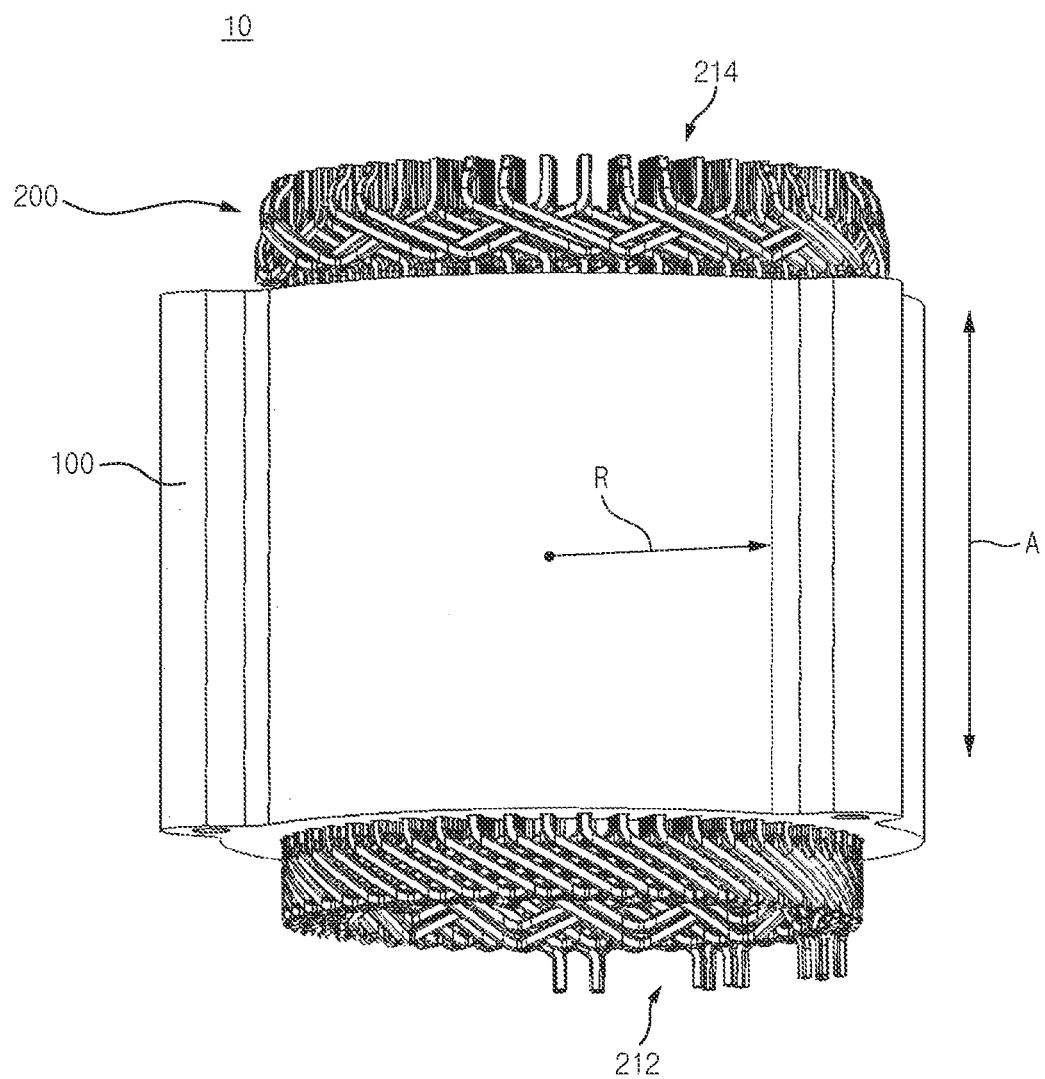
FIG. 1 is a side view of illustrating a structure of a stator according to an embodiment of the present disclosure.

Throughout the drawings and the detailed description, unless otherwise described or provided, the same drawing reference numerals will be understood to refer to the same or like elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

The terminology used herein is for the purpose of describing particular examples only and is not to be limiting of the examples. The singular forms "a", "an", and "the" are intended to include the plural forms as well, unless the context clearly indicates otherwise. It will be further understood that the terms "comprises/comprising" and/or "includes/including" when used herein, specify the presence of stated features, integers, steps, operations, elements, and/or components, but do not preclude the presence or addition of one or more other features, integers, steps, operations, elements, components and/or groups thereof.

Also, in the description of the components, terms such as first, second, A, B, (a), (b) or the like may be used herein when describing components of the present disclosure. These terms are used only for the purpose of discriminating one constituent element from another constituent element, and the nature, the sequences, or the orders of the constituent elements are not limited by the terms. When one constituent element is described as being "connected", "coupled", or "attached" to another constituent element, it should be understood that one constituent element can be connected or attached directly to another constituent element, and an intervening constituent element can also be "connected", "coupled", or "attached" to the constituent elements.

Hereinafter, a stator and a motor according to the present disclosure will be described with reference to the drawings.

Stator

Figure 2:
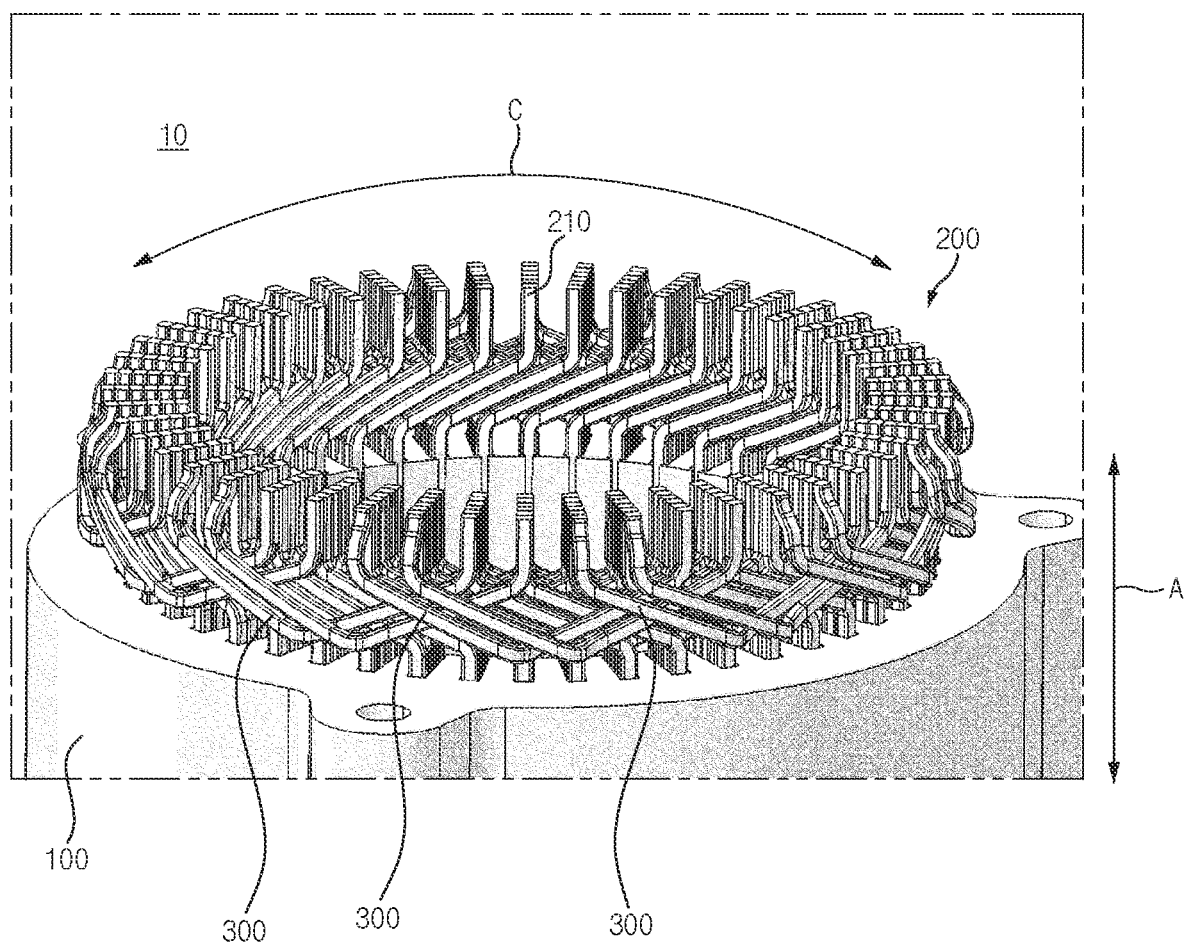
FIG. 2 is an enlarged perspective view illustrating an upper structure of the stator according to the embodiment of the present disclosure.
Figure 3:
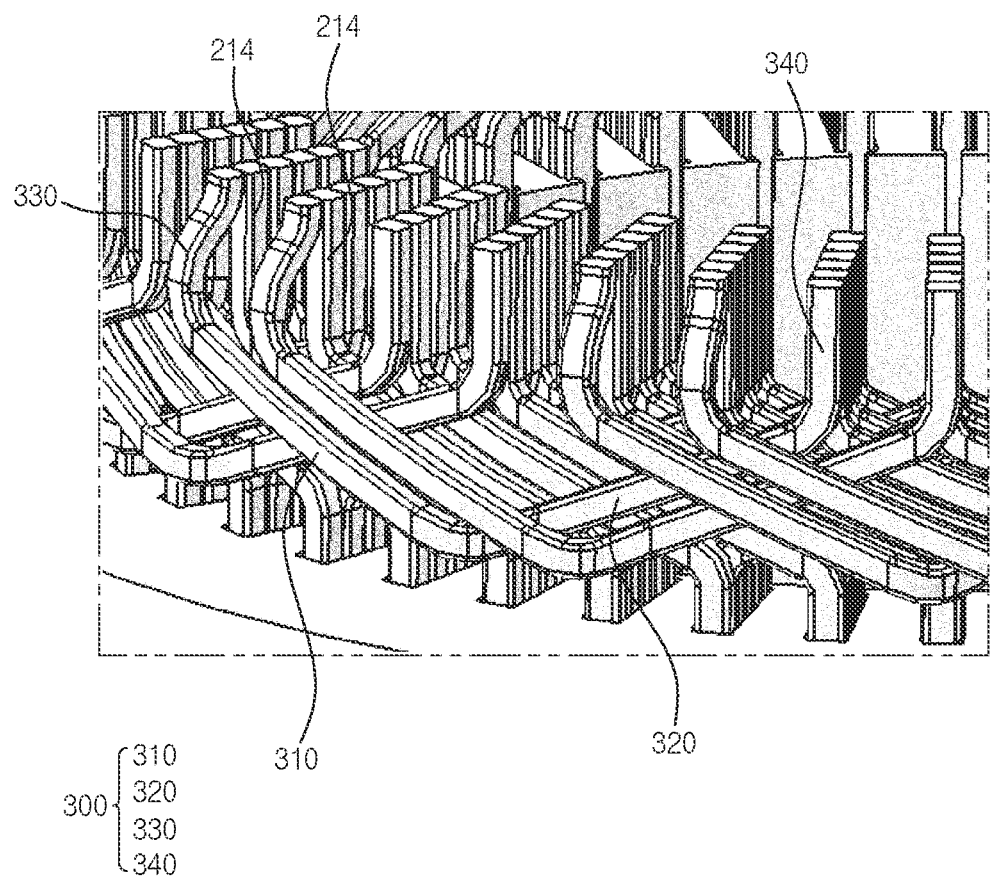
FIG. 3 is an enlarged perspective view illustrating a connection coil provided in the stator according to the embodiment of the present disclosure.
Figure 4:
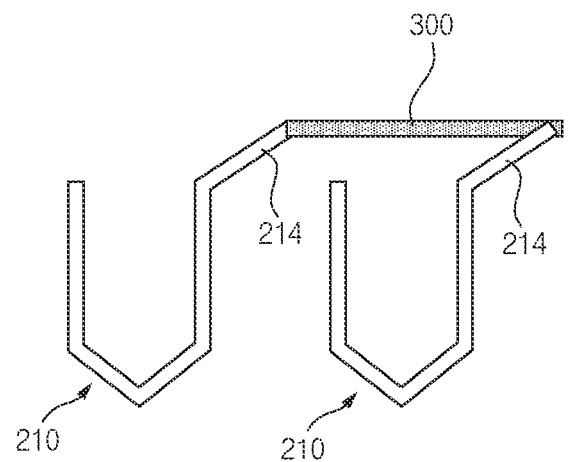
FIG. 4 is a view schematically illustrating a connection relationship between a hairpin and the connection coil in the stator according to the embodiment of the present disclosure.
Figure 5:
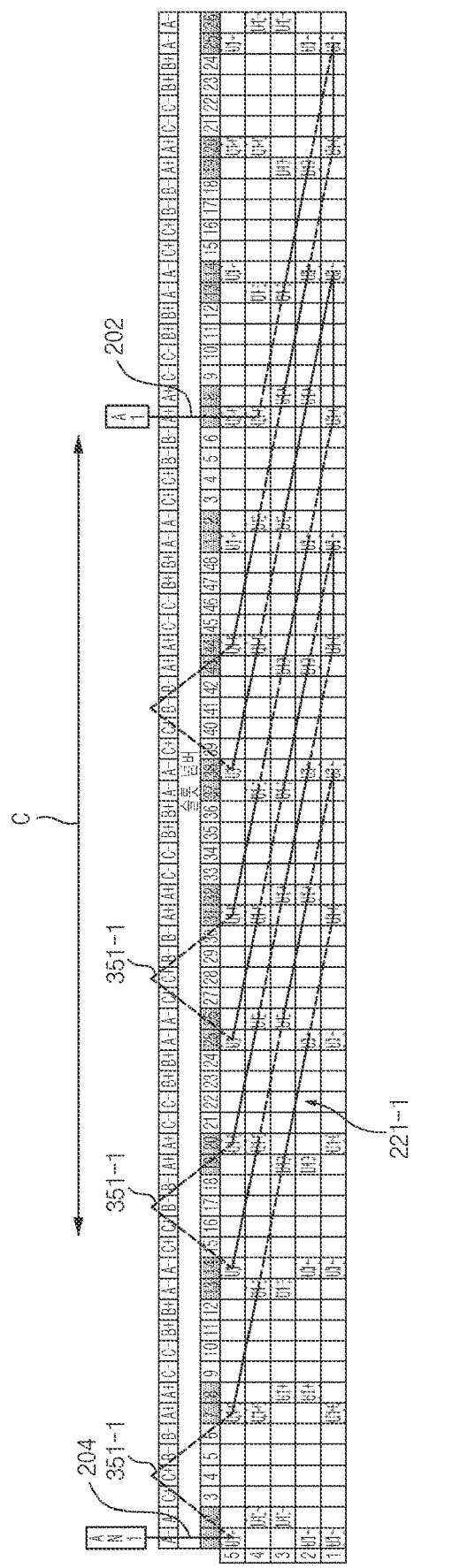
FIG. 5 is a winding diagram of a first-first parallel coil provided in the stator according to the present disclosure.
Figure 6:
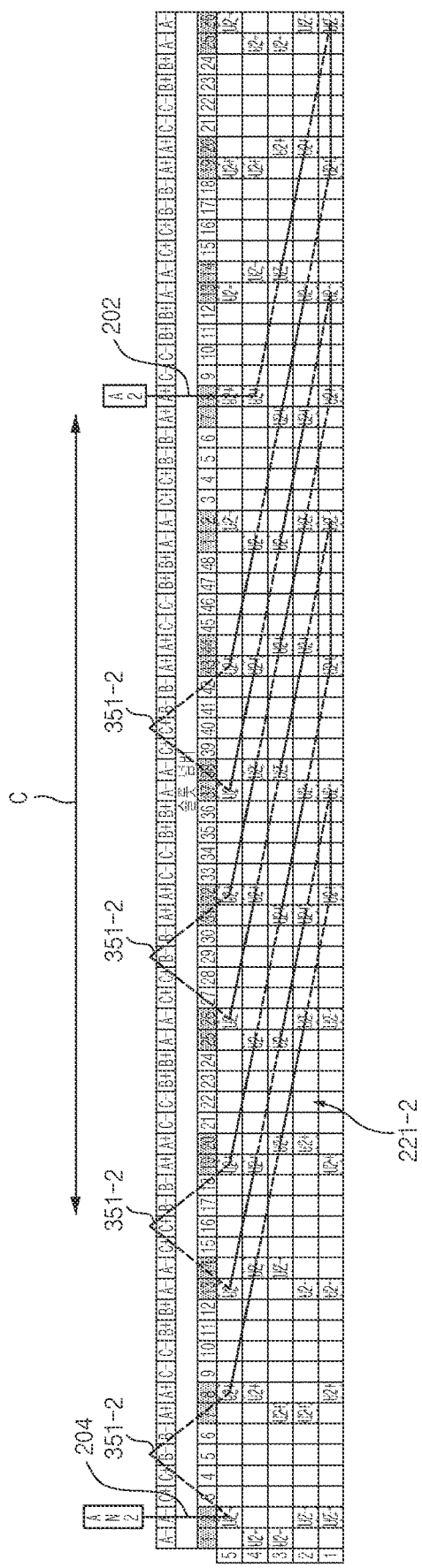
FIG. 6 is a winding diagram of a first-second parallel coil provided in the stator according to the present disclosure.

FIG. 1 is a side view of illustrating a structure of a stator according to an embodiment of the present disclosure, and FIG. 2 is an enlarged perspective view illustrating an upper structure of the stator according to the embodiment of the present disclosure. In addition, FIG. 3 is an enlarged perspective view illustrating a connection coil provided in the stator according to the embodiment of the present disclosure, and FIG. 4 is a view schematically illustrating a connection relationship between a hairpin and the connection coil in the stator according to the embodiment of the present disclosure. In addition, FIG. 5 is a winding diagram of a first-first parallel coil provided in the stator according to the present disclosure, and FIG. 6 is a winding diagram of a first-second parallel coil provided in the stator according to the present disclosure.

A stator 10 according to the present disclosure may be a stator provided in a hairpin motor.

In more detail, the stator 10 may include a stator core 100 having a plurality of slots formed in a circumferential direction C, and a plurality of coil bundles 200 respectively inserted into the plurality of slots. The coil bundles 200 may each include a plurality of hairpins 210.

In this case, the hairpin 210 may include a crown portion 212 protruding toward one side in an axial direction A of the stator core 100, and a leg portion 214 protruding toward the other side in the axial direction A. For example, FIG. 1 illustrates that the leg portion 214 is disposed in an upper region of the stator 10, and the crown portion 212 is disposed in a lower region thereof.

According to the present disclosure, a plurality of layers may be formed in slots provided in the stator core 100. A plurality of coil bundles 200 may be inserted into the layers, respectively. In addition, the plurality of coil bundles 200 may each include an extension line 202 and a neutral line 204. Therefore, according to the present disclosure, the current may be supplied to the plurality of coil bundles 200 through the extension line 202, and the plurality of coil bundles 200 may be electrically connected to one another at a neutral point through the neutral line 204. In more detail, the extension line 202 and the neutral line 204 may be joined to a busbar (not illustrated) provided separately.

Meanwhile, according to the present disclosure, an odd number of layers may be respectively formed in the slots provided in the stator core 100.

In general, the coil bundle including the hairpins needs to have a region in which the current is supplied, and a region in which the current flows out. Therefore, the hairpins each have the even number of leg portions. In addition, the hairpin is joined to another adjacent hairpin through the leg portion. One leg portion of the joined two hairpins is extended from the odd-numbered layer, and the other leg portion is extended from the even-numbered layer. Therefore, in the related art, the even number of layers are respectively formed in the slots provided in the stator core. However, because the even number of layers are inevitably formed on the stator core in the related art, there is a problem in that the design of the motor is restrictive.

To solve the problem, according to the embodiment of the present disclosure, the stator 10 may include connection coils 300 each having one side joined to one of the plurality of coil bundles 200, and the other side joined to another of the plurality of coil bundles 200. The connection coils 300 are disposed between the plurality of coil bundles 200. The connection coils 300 may be configured to electrically connect the plurality of hairpins 210 respectively provided on the plurality of coil bundles 200.

According to the present disclosure, the leg portions 214 of the hairpins may be joined to one another through the connection coils 300 even though the odd number of layers are respectively formed in the slots provided in the stator core 100. Therefore, the motor having various performances may be designed in comparison with the configuration in which the even number of layers are formed on the stator core. In particular, according to the present disclosure, it is possible to manufacture the motor having various types of equivalent serial numbers of turns, thereby considerably improving a degree of design freedom of the motor.

Referring to FIGS. 1 to 4, the connection coil 300 may include: a first extension region 310 extending in a first direction, a second extension region 320 extending in a second direction and having one end portion connected to one end portion of the first extension region 310, a first joint region 330 connected to the other end portion of the first extension region 310 and joined to the leg portion 214 extended from one layer of the plurality of hairpins 210, and a second joint region 340 connected to the other end portion of the second extension region 320 and joined to the leg portion 214 extended from another layer of the plurality of hairpins 210. In this case, as illustrated in FIG. 3, the first extension region 310 and the first joint region 330 may have a shape symmetric to the second extension region 320 and the second joint region 340.

In addition, the first extension region 310 and the second extension region 320 may be disposed closer to the stator core 100 than are the first joint region 330 and the second joint region 340, respectively. Therefore, the first extension region 310 and the second extension region 320 of the connection coil 300 may have a 'V' or 'U' shape so that the region in which the first extension region 310 and the second extension region 320 are connected to each other protrudes toward the stator core 100.

In more detail, when viewed from one side in a radial direction R of the stator 10, the first joint region 330 may be disposed to overlap the leg portion 214 joined to the first joint region 330, and the second joint region 340 may be disposed to overlap the leg portion 214 joined to the second joint region 340.

Meanwhile, according to the present disclosure, the stator 10 may be supplied with three-phase current. That is, the plurality of coil bundles 200 may be supplied with three-phase current.

In this case, the plurality of coil bundles 200 may include a first coil bundle configured to be supplied with U-phase current of the three-phase current, a second coil bundle configured to be supplied with V-phase current of the three-phase current, and a third coil bundle configured to be supplied with W-phase current of the three-phase current.

In addition, the connection coils 300 may include first connection coils joined to the plurality of hairpins provided in the first coil bundle, second connection coils joined to the plurality of hairpins provided in the second coil bundle, and third connection coils joined to the plurality of hairpins provided in the third coil bundle.

In addition, according to the present disclosure, at least some of the first to third connection coils may be respectively joined to the two hairpins extended from the outermost or innermost layers of the plurality of hairpins 210 in the radial direction R. More particularly, the first to third connection coils may be respectively joined to i) the leg portions of the two hairpins extended from the outermost layers of the plurality of hairpins 210 in the radial direction R or ii) the leg portions of the two hairpins extended from the innermost layers of the plurality of hairpins 210 in the radial direction R.

Referring to FIGS. 5 and 6, the first coil bundle may include a first-first parallel coil 221-1 including the extension line 202 and the neutral line 204 respectively disposed at one end portion and the other end portion thereof. In this case, the neutral line 204 provided in the first-first parallel coil 221-1 may be disposed adjacent to the outermost or innermost layer in the radial direction R.

Referring to FIGS. 5 and 6, the first coil bundle may further include a first-second parallel coil 221-2 including the extension line 202 and the neutral line 204 respectively disposed at one end portion and the other end portion thereof. In this case, the neutral line 204 provided in the first-second parallel coil 221-2 may be disposed adjacent to the outermost or innermost layer in the radial direction R.

More particularly, according to the present disclosure, both the neutral line 204 provided in the first-first parallel coil 221-1 and the neutral line 204 provided in the first-second parallel coil 221-2 may be disposed on i) the outermost layer in the radial direction R or ii) the innermost layer in the radial direction R.

Meanwhile, the description of the first coil bundle may also be equally applied to the second coil bundle and the third coil bundle.

That is, the second coil bundle may include a second-first parallel coil and a second-second parallel coil each including the extension line and the neutral line respectively disposed at one end portion and the other end portion thereof. In this case, the neutral lines respectively provided in the second-first parallel coil and the second-second parallel coil may each be disposed adjacent to the outermost or innermost layer in the radial direction R. More particularly, according to the present disclosure, both the neutral line provided in the second-first parallel coil and the neutral line provided in the second-second parallel coil may be disposed on i) the outermost layer in the radial direction R or ii) the innermost layer in the radial direction R.

In addition, the third coil bundle may include a third-first parallel coil and a third-second parallel coil each including the extension line and the neutral line respectively disposed at one end portion and the other end portion thereof. In this case, the neutral lines respectively provided in the third-first parallel coil and the third-second parallel coil may each be disposed adjacent to the outermost or innermost layer in the radial direction R. More particularly, according to the present disclosure, both the neutral line provided in the third-first parallel coil and the neutral line provided in the third-second parallel coil may be disposed on i) the outermost layer in the radial direction R or ii) the innermost layer in the radial direction R.

Hereinafter, winding diagrams of the first-first parallel coil 221-1 and the first-second parallel coil 221-2 provided in the stator according to the embodiment of the present disclosure will be described.

For example, the stator core 100 may have forty-eight slots disposed in the circumferential direction C, and the five layers may be disposed in each of the slots in the radial direction R. The numbers listed in the horizontal direction in the upper regions of the winding diagrams in FIGS. 5 and 6 mean the numbers of the slots, and the numbers listed in the vertical direction in the left regions of the winding diagrams in FIGS. 5 and 6 mean the numbers of the layers of the slots. That is, in the present specification, the forty-eight slots are referred to as first to forty-eighth slots in the circumferential direction C, and the layers are referred to as first to fifth layers in the radial direction R of the slots.

Meanwhile, the first layer may be the innermost layer in the radial direction R, and the fifth layer may be the outermost layer in the radial direction R. However, on the contrary, the first layer may be the outermost layer in the radial direction R, and the fifth layer may be the innermost layer in the radial direction R.

In addition, in the first-first parallel coil 221-1 and the first-second parallel coil 221-2 in FIGS. 5 and 6, the regions indicated by the solid lines may mean that the coils are disposed on the crown portions 212 (see FIG. 1), and the regions indicated by the dotted lines may mean that the coils are disposed on the leg portions 214 (see FIG. 1).

In this case, according to the present disclosure, the first-first parallel coil 221-1 and the first-second parallel coil 221-2 may be respectively inserted into the slots so as to have a combination of five slot pitches, six slot pitches, and seven slot pitches. In addition, the first-first parallel coil 221-1 and the first-second parallel coil 221-2 may be respectively inserted into the slots so as to have an average of six slot pitches.

In more detail, as illustrated in FIGS. 5 and 6, according to the present disclosure, the neutral line 204 of the first-first parallel coil 221-1 may be disposed on the fifth layer of the first slot. The first-first parallel coil 221-1 may sequentially pass through the fifth layer of the seventh slot, the fourth layer of the thirteenth slot, the third layer of the nineteenth slot, the second layer of the twenty-fifth slot, the first layer of the thirty-first slot, the first layer of the thirty-eighth slot, the second layer of the thirty-second slot, the third layer of the twenty-sixth slot, the fourth layer of the twentieth slot, the fifth layer of the fourteenth slot, the fifth layer of the twentieth slot, the fourth layer of the twenty-sixth slot, the third layer of the thirty-second slot, the second layer of the thirty-eighth slot, the first layer of the forty-fourth slot, the first layer of the first slot, the second layer of the forty-third slot, the third layer of the thirty-seven slot, the fourth layer of the thirty-first slot, the fifth layer of the twenty-fifth slot, the fifth layer of the thirty-first slot, the fourth layer of the thirty-seven slot, the third layer of the forty-third slot, the second layer of the first slot, the first layer of the seventh slot, the first layer of the fourteenth slot, the second layer of the eighth slot, the third layer of the second slot, the fourth layer of the forty-fourth slot, the fifth layer of the thirty-eighth slot, the fifth layer of the forty-fourth slot, the fourth layer of the second slot, the third layer of the eighth slot, the second layer of the fourteenth slot, the first layer of the twentieth slot, the first layer of the twenty-fifth slot, the second layer of the nineteenth slot, and the third layer of the thirteenth slot. In addition, the extension line 202 of the first-first parallel coil 221-1 may be disposed on the fourth layer of the seventh slot.

In addition, according to the embodiment of the present disclosure, the first connection coils may include a first-first connection coil 351-1 configured to connect the first-first parallel coil 221-1. In this case, according to the embodiment of the present disclosure, the first-first connection coil 351-1 may connect a region protruding from the fifth layer of the first slot and a region protruding from the fifth layer of the seventh slot of the first-first parallel coil 221-1, connect a region protruding from the fifth layer of the fourteenth slot and a region protruding from the fifth layer of the twentieth slot of the first-first parallel coil 221-1, connect a region protruding from the fifth layer of the twenty-fifth slot and a region protruding from the fifth layer of the thirty-first slot of the first-first parallel coil 221-1, and connect a region protruding from the fifth layer of the thirty-eighth slot and a region protruding from the fifth layer of the forty-fourth slot of the first-first parallel coil 221-1.

Referring to FIGS. 5 and 6, according to the present disclosure, the neutral line 204 of the first-second parallel coil 221-2 may be disposed on the fifth layer of the second slot. The first-second parallel coil 221-2 may sequentially pass through the fifth layer of the eighth slot, the fourth layer of the fourteenth slot, the third layer of the twentieth slot, the second layer of the twenty-sixth slot, the first layer of the thirty-second slot, the first layer of the thirty-seven slot, the second layer of the thirty-first slot, the third layer of the twenty-fifth slot, the fourth layer of the nineteenth slot, the fifth layer of the thirteenth slot, the fifth layer of the nineteenth slot, the fourth layer of the twenty-fifth slot, the third layer of the thirty-first slot, the second layer of the thirty-seven slot, the first layer of the forty-third slot, the first layer of the second slot, the second layer of the forty-fourth slot, the third layer of the thirty-eighth slot, the fourth layer of the thirty-second slot, the fifth layer of the twenty-sixth slot, the fifth layer of the thirty-second slot, the fourth layer of the thirty-eighth slot, the third layer of the forty-fourth slot, the second layer of the second slot, the first layer of the eighth slot, the first layer of the thirteenth slot, the second layer of the seventh slot, the third layer of the first slot, the fourth layer of the forty-third slot, the fifth layer of the thirty-seven slot, the fifth layer of the forty-third slot, the fourth layer of the first slot, the third layer of the seventh slot, the second layer of the thirteenth slot, the first layer of the nineteenth slot, the first layer of the twenty-sixth slot, the second layer of the twentieth slot, and the third layer of the fourteenth slot. In addition, the extension line 202 of the first-second parallel coil 221-2 may be disposed on the fourth layer of the eighth slot.

In addition, according to the embodiment of the present disclosure, the first connection coils may further include a first-second connection coil 351-2 configured to connect the first-second parallel coil 221-2. In this case, according to the embodiment of the present disclosure, the first-second connection coil 351-2 may connect a region protruding from the fifth layer of the second slot and a region protruding from the fifth layer of the eighth slot of the first-second parallel coil 221-2, connect a region protruding from the fifth layer of the thirteenth slot and a region protruding from the fifth layer of the nineteenth slot of the first-second parallel coil 221-2, connect a region protruding from the fifth layer of the twenty-sixth slot and a region protruding from the fifth layer of the thirty-second slot of the first-second parallel coil 221-2, and connect a region protruding from the fifth layer of the thirty-seven slot and a region protruding from the fifth layer of the forty-third slot of the first-second parallel coil 221-2.

Figure 7:
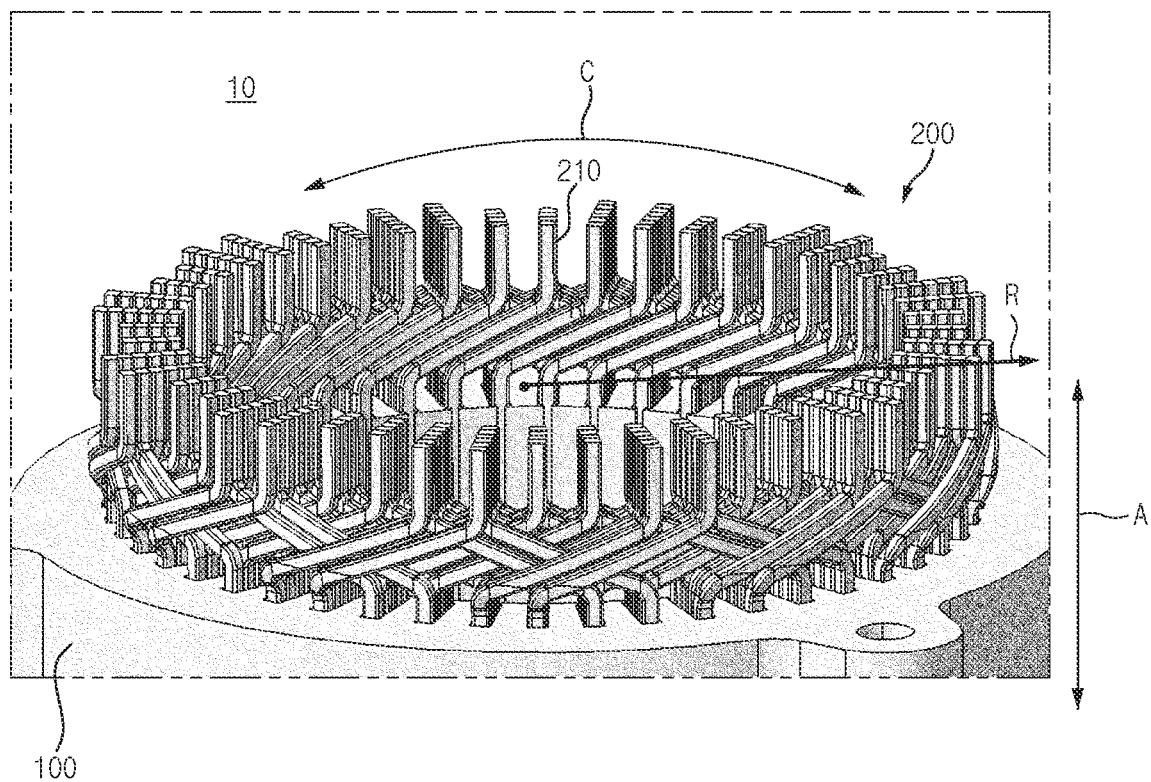
FIG. 7 is an enlarged perspective view illustrating an upper structure of a stator according to another embodiment of the present disclosure.
Figure 8:
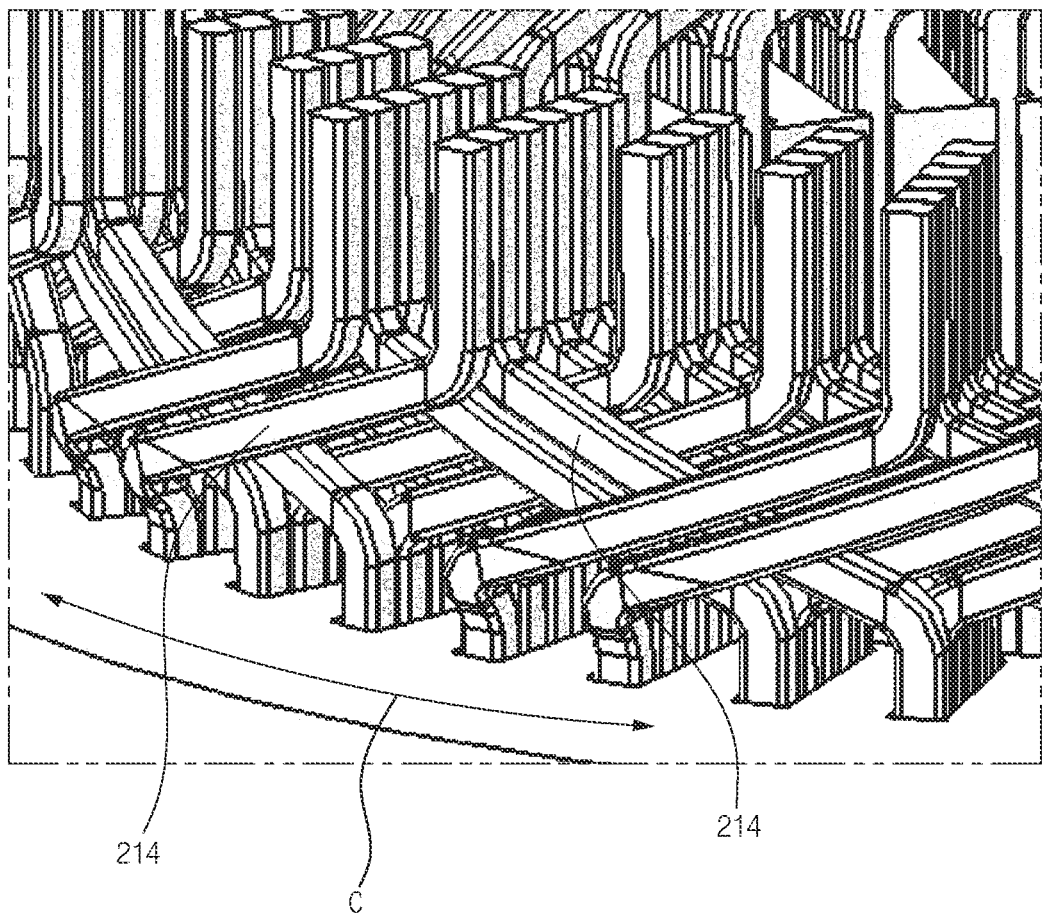
FIG. 8 is an enlarged perspective view illustrating a region in which hairpins are joined in the stator according to another embodiment of the present disclosure.

FIG. 7 is an enlarged perspective view illustrating an upper structure of a stator according to another embodiment of the present disclosure, and FIG. 8 is an enlarged perspective view illustrating a region in which hairpins are joined in the stator according to another embodiment of the present disclosure. In addition, FIG. 9 is a view schematically illustrating a connection relationship between the hairpins in the stator according to another embodiment of the present disclosure.

Figure 9:
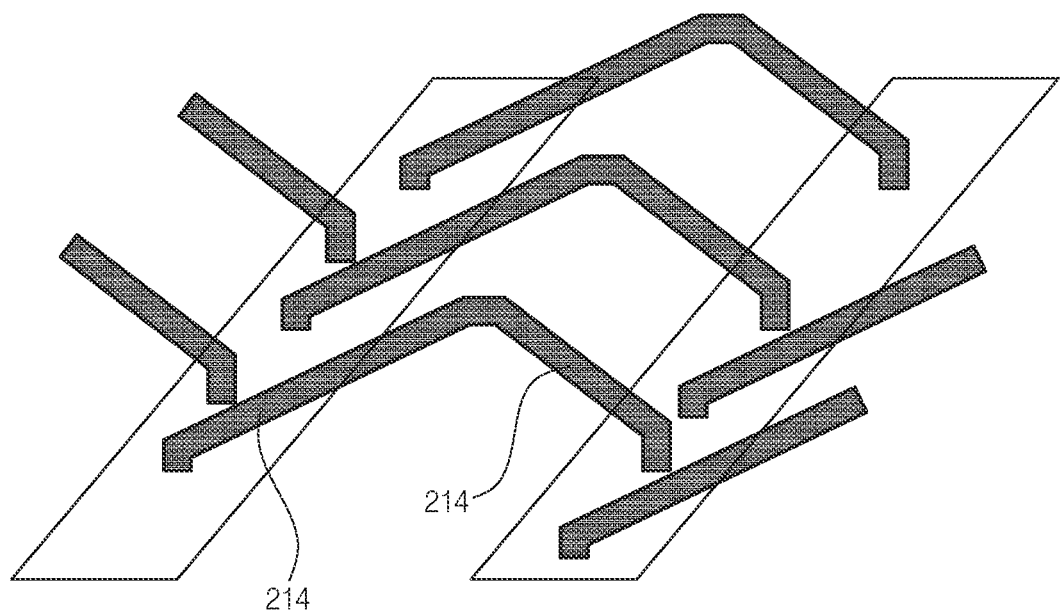
FIG. 9 is a view schematically illustrating a connection relationship between the hairpins in the stator according to another embodiment of the present disclosure.

Referring to FIGS. 7 to 9, the stator 10 according to the present embodiment of the present disclosure may include the stator core 100 having the plurality of slots formed in the circumferential direction C, and the plurality of coil bundles 200 respectively inserted into the plurality of slots. The plurality of layers may be respectively formed in the plurality of slots in the radial direction R of the stator core 100.

In addition, the coil bundle 200 may include the plurality of hairpins 210 each including the crown portion 212 protruding toward one side in the axial direction A of the stator core 100, and the leg portion 214 protruding toward the other side in the axial direction A.

In this case, according to the embodiment of the present disclosure, some of the plurality of leg portions 214 protruding from the outermost or innermost layer in the radial direction R may be joined to one another and define joint regions.

In more detail, according to another embodiment of the present disclosure, as illustrated in FIGS. 8 and 9, one of the two leg portions 214 joined in the joint region may be bent in one direction (e.g., a clockwise direction) of the circumferential direction C, and the other of the two leg portions 214 joined in the joint region may be bent in the other direction (e.g., a counterclockwise direction) opposite to one direction of the circumferential direction C.

According to the present embodiment of the present disclosure, since the two leg portions 214, which defines the joint region, may be bent in the opposite directions, it is possible to manufacture the stator having the odd number of layers without the connection coil 300 provided in the stator according to the above-mentioned embodiment of the present disclosure.

Meanwhile, the above-mentioned description of the method of winding the coils of the stator according to the present disclosure with reference to FIGS. 5 and 6 may also be equally applied to the stator according to another embodiment of the present disclosure.

Motor

A motor according to the present disclosure may include a rotor and the stator 10 according to the embodiment of the present disclosure.

In more detail, the stator 10 may include the stator core 100 having the plurality of slots formed in the circumferential direction C, the plurality of coil bundles 200 respectively inserted into the plurality of slots, and the connection coils 351-1 and 351-2 each having one side joined to one of the plurality of coil bundles 200, and the other side joined to another of the plurality of coil bundles 200. In this case, the plurality of layers may be respectively formed in the plurality of slots in the radial direction R of the stator 10. The plurality of coil bundles 200 may each include the plurality of hairpins 210 each including the crown portion 212 protruding toward one side in the axial direction A of the stator core 100, and the leg portion 214 protruding toward the other side in the axial direction A.

Alternatively, the motor according to the present disclosure may include the rotor and the stator 10 according to another embodiment of the present disclosure.

In more detail, the stator 10 may include the stator core 100 having the plurality of slots formed in the circumferential direction C, and the plurality of coil bundles 200 respectively inserted into the plurality of slots. The plurality of layers may be respectively formed in the plurality of slots in the radial direction R of the stator core 100. In this case, the plurality of coil bundles 200 may each include the plurality of hairpins 210 each including the crown portion 212 protruding toward one side in the axial direction A of the stator core 100, and the leg portion 214 protruding toward the other side in the axial direction A. Some of the plurality of leg portions 214 protruding from the outermost or innermost layer in the radial direction R may be joined to one another and define the joint regions. In more detail, one of the two leg portions 214 joined in the joint region may be bent in one direction of the circumferential direction C, and the other of the two leg portions 214 joined in the joint region may be bent in the other direction of the circumferential direction C.

The above-mentioned description has been made to optimally design a motor by increasing a range of selection of an equivalent serial number of turns at the time of designing a hairpin motor.

Meanwhile, the above-mentioned description of the stator 10 according to one embodiment and another embodiment of the present disclosure may also be equally applied to the motor according to the present disclosure.

The above-mentioned description makes it possible to optimally design the motor by increasing the range of selection of the equivalent serial number of turns at the time of designing the hairpin motor.

The While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A stator comprising:
 a stator core having a plurality of slots formed in a circumferential direction;
 a plurality of coil bundles respectively inserted into each of the plurality of slots;
 a plurality of connection coils each having one side joined to one of the plurality of coil bundles, and the other side joined to another of the plurality of coil bundles; and
 a plurality of layers being respectively formed in each of the plurality of slots in a radial direction of the stator core, wherein the plurality of coil bundles each comprises a plurality of hairpins each comprising a crown portion protruding toward one side in an axial direction of the stator core, and a leg portion protruding toward the other side in the axial direction, and wherein at least one connection coil of the plurality of connection coil comprises:
- a first extension region extending in a first direction;
- a second extension region extending in a second direction and having one end portion connected to one end portion of the first extension region;
- a first joint region connected to the other end portion of the first extension region and joined to the leg portion extended from a hairpin of the plurality of hairpins; and
- a second joint region connected to the other end portion of the second extension region and joined to the leg portion extended from another hairpin of the plurality of hairpins, and
  - wherein the first extension region and the first joint region have a shape symmetric to the second extension region and the second joint region, wherein the plurality of coil bundles is supplied with three-phase-current, wherein the plurality of coil bundles comprises:
- a first coil bundle configured to be supplied with U-phase current of the three-phase current;
- a second coil bundle configured to be supplied with V-base current of the three-phase current; and
- a third coil bundle configured to be supplied with W-phase current of the three-phase current, and wherein the connection coils comprise:
- a first connection coil joined to the plurality of hairpins provided in the first coil bundle;
- a second connection coil joined to the plurality of hairpins provided in the secondi coil bundle; and
- a third connection coil joined to the plurality of hairpins in the third coil bundle, wherein at least one of the connection coils are respectively joined to the two hairpins provided in an outermost or innermost layer of the plurality of hairpins in the radial direction, wherein the first coil bundle comprises a first-parallel coil comprising an extension line and a neutral line disposed at one end portion and the other end portion thereof, and the neutral line of the first-first parallel coil is disposed adjacent to the outermost or innermost layer in the radial direction wherein the first coil bundle further comprises a first second parallel coil comprising an extension line and a neutral line disposed at one end portion and the other end portion thereof, and the neutral line of the first-second parallel coil is disposed adjacent to the outermost or innermost layer in the radial direction, wherein the stator core has forty-eight slots in the circumferential direction, and live layers are disposed in each of the slots in the radial direction, and wherein the first-first parallel coil and the first-second parallel coil are respectively inserted into the slots to have a combination of five slot pitches, six slot pitches, and seven slot pitches.

2. The stator of claim 1, wherein an odd number of the plurality of layers are respectively formed in the plurality of slots.

3. The stator of claim 1, wherein the first extension region and the second extension region are disposed closer to the stator core than are the first joint region and the second joint region.

4. The stator of claim 1, wherein the first joint region is disposed to overlap the leg portion joined to the first joint region, and the second joint region is disposed to overlap the leg portion joined to the second joint region in the radial direction.

5. The stator of claim 1, wherein the forty-eight slots comprise a first to forty-eighth slots in the circumferential direction, and the layers comprise a first to fifth layers in the radial direction of the slots,
  - wherein the neutral line of the first-first parallel coil is disposed on the fifth layer of the first slot,
  - wherein the first-first parallel coil sequentially passes through the fifth layer of the seventh slot, the fourth layer of the thirteenth slot, the third layer of the nineteenth slot, the second layer of the twenty-fifth slot, the first layer of the thirty-first slot, the first layer of the thirty-eighth slot, the second layer of the thirty-second slot, the third layer of the twenty-sixth slot, the fourth layer of the twentieth slot, the fifth layer of the fourteenth slot, the fifth layer of the twentieth slot, the fourth layer of the twenty-sixth slot, the third layer of the thirty-second slot, the second layer of the thirty-eighth slot, the first layer of the forty-fourth slot, the first layer of the first slot, the second layer of the forty-third slot, the third layer of the thirty-seven slot, the fourth layer of the thirty-first slot, the fifth layer of the twenty-fifth slot, the fifth layer of the thirty-first slot, the fourth layer of the thirty-seven slot, the third layer of the forty-third slot, the second layer of the first slot, the first layer of the seventh slot, the first layer of the fourteenth slot, the second layer of the eighth slot, the third layer of the second slot, the fourth layer of the forty-fourth slot, the fifth layer of the thirty-eighth slot, the fifth layer of the forty-fourth slot, the fourth layer of the second slot, the third layer of the eighth slot, the second layer of the fourteenth slot, the first layer of the twentieth slot, the first layer of the twenty-fifth slot, the second layer of the nineteenth slot, and the third layer of the thirteenth slot, and
  - wherein the extension line of the first-first parallel coil is disposed on the fourth layer of the seventh slot.

6. The stator of claim 5, wherein the first connection coil comprises a first-first connection coil, and
  - wherein the first-first connection coil connects a region protruding from the fifth layer of the first slot and a region protruding from the fifth layer of the seventh slot of the first-first parallel coil, connects a region protruding from the fifth layer of the fourteenth slot and a region protruding from the fifth layer of the twentieth slot of the first-first parallel coil, connects a region protruding from the fifth layer of the twenty-fifth slot and a region protruding from the fifth layer of the thirty-first slot of the first-first parallel coil, and connects a region protruding from the fifth layer of the thirty-eighth slot and a region protruding from the fifth layer of the forty-fourth slot of the first-first parallel coil.

7. The stator of claim 6, wherein the neutral line of the first-second parallel coil is disposed on the fifth layer of the second slot,
  - wherein the first-second parallel coil sequentially passes through the fifth layer of the eighth slot, the fourth layer of the fourteenth slot, the third layer of the twentieth slot, the second layer of the twenty-sixth slot, the first layer of the thirty-second slot, the first layer of the thirty-seven slot, the second layer of the thirty-first slot, the third layer of the twenty-fifth slot, the fourth layer of the nineteenth slot, the fifth layer of the thirteenth slot, the fifth layer of the nineteenth slot, the fourth layer of the twenty-fifth slot, the third layer of the thirty-first slot, the second layer of the thirty-seven slot, the first layer of the forty-third slot, the first layer of the second slot, the second layer of the forty-fourth slot, the third layer of the thirty-eighth slot, the fourth layer of the thirty-second slot, the fifth layer of the twenty-sixth slot, the fifth layer of the thirty-second slot, the fourth layer of the thirty-eighth slot, the third layer of the forty-fourth slot, the second layer of the second slot, the first layer of the eighth slot, the first layer of the thirteenth slot, the second layer of the seventh slot, the third layer of the first slot, the fourth layer of the forty-third slot, the fifth layer of the thirty-seven slot, the fifth layer of the forty-third slot, the fourth layer of the first slot, the third layer of the seventh slot, the second layer of the thirteenth slot, the first layer of the nineteenth slot, the first layer of the twenty-sixth slot, the second layer of the twentieth slot, and the third layer of the fourteenth slot, and wherein the extension line of the first-second parallel coil is disposed on the fourth layer of the eighth slot.

8. The stator of claim 7, wherein the first connection coil further comprises a first-second connection coil, and wherein the first-second connection coil connects a region protruding from the fifth layer of the second slot and a region protruding from the fifth layer of the eighth slot of the first-second parallel coil, connects a region protruding from the fifth layer of the thirteenth slot and a region protruding from the fifth layer of the nineteenth slot of the first-second parallel coil, connects a region protruding from the fifth layer of the twenty-sixth slot and a region protruding from the fifth layer of the thirty-second slot of the first-second parallel coil, and connects a region protruding from the fifth layer of the thirty-seven slot and a region protruding from the fifth layer of the forty-third slot of the first-second parallel coil.

9. A stator comprising:
a stator core having a plurality of slots formed in a circumferential direction;
a plurality of coil bundles respectively inserted into each of the plurality of slots;
a plurality of connection coils each having one side joined to one of the plurality of coil bundles, and the other side joined to another of the plurality of coil bundles; and
a plurality of layers being respectively formed in each of the plurality of slots in a radial direction of the stator core,
wherein the plurality of coil bundles each comprises a plurality of hairpins each comprising a crown portion protruding toward one side in an axial direction of the stator core, and a leg portion protruding toward the other side in the axial direction,
wherein some of the plurality of leg portions protruding from an outermost or innermost layer in the radial direction are joined to one another to form joint regions, and
wherein an odd number of the plurality of layers are respectively formed in each of the plurality of slots
wherein at least one connection coil of the plurality of connection coil comprises:

a first extension region extending in a first direction;
a second extension region extending in a second direction and having one end portion connected to one end portion of the first region;
a first joint region connected to the other end portion of the first extension region and joined to the leg portion extended from a hairpin of the plurality of hairpins; and
a second joint region connected to the other end portion of the second extension region and joined to the leg portion extended from another hairpin of the plurality of hairpins, and
wherein the first extension region and the first joint region have a shape symmetric to the second extension region and the second joint region,
wherein the plurality of coil bundles is supplied with three-phase current,
wherein the plurality of coil bundles comprises:
a first coil bundle configured to be supplied with U-phase current of the three-phase current;
a second coil bundle configured to be supplied with V-phase current of the three-phase current; and
a third coil bundle configured to be supplied with W-phase current of the three-phase current, and
wherein the connection coils comprise:
a first connection coil joined to the plurality of hairpins provided in the first coil bundle;
a second connection coil joined to the plurality of hairpins provided in the second coil bundle; and
a third connection coil joined to the plurality of hairpins provided in the third coil bundle,
wherein at least one of the connection coils are respectively joined to the two hairpins provided in an outermost or innermost layer of the plurality of hairpins in the radial direction,
wherein the first coil bundle comprises a first-first parallel coil comprising an extension line and a neutral line dispose tone and the other end portion thereof, and the neutral line of the first-first parallel coil is disposed adjacent to the outermost or innermost layer in the radial direction
wherein the first coil bundle further comprises a first-second parallel coil comprising an extension line and a neutral line disposed at one end portion and the other end portion thereof, and the neutral line of the first-second parallel coil is disposed adjacent to the outermost or innermost layer in the radial direction,
wherein the stator core has forty-eight slots in the circumferential direction, and five layers are disposed in each of the slots in the radial direction, and
wherein the first-first parallel coil and the first-second parallel coil are respectively inserted into the slots to have a combination of five slot pitches, six slot pitches, and seven slot pitches.

10. The stator of claim 9, wherein one of the two leg portions joined in the joint region is bent in one direction of the circumferential direction, and the other of the two leg portions joined in the joint region is bent in the other direction of the circumferential direction.

11. A motor comprising:
a stator; and
a rotor,
wherein the stator comprises:
a stator core having a plurality of slots formed in a circumferential direction;
a plurality of coil bundles respectively inserted into each of the plurality of slots;

a plurality of connection coils each having one side joined to one of the plurality of coil bundles, and the other side joined to another of the plurality of coil bundles; and a plurality of layers being respectively formed in each of the plurality of slots in a radial direction of the stator core, wherein the plurality of coil bundles each comprises a plurality of hairpins each comprising a crown portion protruding toward one side in an axial direction of the stator core, and a leg portion protruding toward the other side in the axial direction wherein at least one connection coil of the plurality of connection coil comprises:
 a first extension region extending in a first direction;
 a second extension region extending in a second direction and having one end portion connected to one end portion of the first extension region;
 a first joint region connected to the other end portion of the extension region and joined to the leg portion extended from a hairpin of the plurality of hairpins; and
 a second joint region connected to the other end portion of the second extension region and joined to the leg portion extended from another hairpin of the plurality of hairpins, and
 wherein the first extension region and the first joint region have a shape symmetric to the second extension region and the second joint region, wherein the plurality of coil bundles is supplied with three-phase current, wherein the plurality of coil bundles comprises:
 a first coil bundle configured to be supplied with U-phase current of the three-phase current;
 a second coil bundle configured to be supplied with V-phase current of the three-phase current; and
 a third coil bundle configured to be supplied with W-phase current of the three-phase current, and wherein the connection coils comprise:
 a first connection coil joined to the plurality of hairpins provided in the first coil bundle;
 a second connection coil joined to the plurality of hairpins provided in the second coil bundle; and
 a third connection coil joined to the plurality of hairpins provided in the third coil bundle, wherein at least one of the connection coils are respectively joined to the two hairpins provided in an outermost or innermost layer of the plurality of hairpins in the radial direction, wherein the first coil bundle comprises a first-first parallel coil comprising an extension line and a neutral line disposed at one end portion and the other end portion thereof, and the neutral line of the first-first parallel coil is disposed adjacent to the outermost or innermost layer in the radial direction wherein the first coil bundle further comprises a first-second parallel coil comprising an extension line and a neutral line disposed at one end portion and the other end portion thereof, and the neutral line of the first-second parallel coil is disposed adjacent to the outermost or innermost layer in the radial direction, wherein the stator core has forty-eight slots in the circumferential direction, and five layers are disposed in each of the slots in the radial direction, and wherein the first-first parallel coil and the first-second parallel coil are respectively inserted into the slots to have a combination of five slot pitches, six slot pitches, and seven slot pitches.

\* \* \* \* \*